United States Patent [19]

Kennedy

[11] Patent Number: 4,508,564
[45] Date of Patent: Apr. 2, 1985

[54] SCRAP METAL RECLAIMING PROCESS

[75] Inventor: James A. Kennedy, Newnan, Ga.

[73] Assignee: The William L. Bonnell Company, Newnan, Ga.

[21] Appl. No.: 611,138

[22] Filed: May 17, 1984

[51] Int. Cl.³ ............................................. C22B 21/00
[52] U.S. Cl. .................................. 75/65 R; 75/68 R; 266/901; 134/2; 134/19; 134/37
[58] Field of Search ....................... 75/63, 65 R, 68 R; 266/901; 134/2, 19, 37

[56] References Cited

U.S. PATENT DOCUMENTS

| | | | |
|---|---|---|---|
| 3,650,830 | 3/1972 | Mathis | 134/19 |
| 4,010,935 | 3/1977 | Stephens | 266/901 |
| 4,264,060 | 4/1981 | Twyman | 266/901 |
| 4,394,166 | 7/1983 | Kennedy | 75/65 R |
| 4,411,695 | 10/1983 | Twyman | 75/68 R |

OTHER PUBLICATIONS

*Chemical Engineering Progress* Jul. 1982, pp. 81-83.

Primary Examiner—M. J. Andrews
Attorney, Agent, or Firm—Donald L. Johnson; John F. Sieberth; Paul H. Leonard

[57] ABSTRACT

A method for reclaiming aluminum scrap containing thermal barrier material in a non-polluting manner comprising the steps of comminuting the scrap to relatively short pieces, conveying the comminuted scrap to a storage hopper, feeding the comminuted aluminum scrap product to a fluidized bed furnace, heating the scrap to a predetermined temperature for a sufficient amount of time to reduce the thermal barrier material and any other undesirable material in the scrap to combustible gas and cinder to produce a satisfactory aluminum melt furnace feed product, and then feeding the treated scrap product to an aluminum melt furnace and further processing. The method may be either a batch one or a continuous one.

16 Claims, 2 Drawing Figures

SCRAP METAL RECLAIMING PROCESS

BACKGROUND OF THE INVENTION

The present invention is in the general field of processing metal scrap, especially aluminum metal scrap so as to recover the metal in such scrap. The invention is particularly directed to a method for recovering metal from aluminum thermal barrier scrap.

With the ever increasing costs in energy, it becomes more and more desirable to process metal scrap, especially aluminum scrap so as to recover the aluminum so that the metal can be reutilized. Scrap aluminum is usually contaminated with two different types of contaminants, organic contaminants and inorganic contaminants. Organic contaminants most commonly consists of remnants of various types of oils, remnants of various types of coatings or paints and the like. The inorganic contaminants present may include dust particles, pigments indicated previously, minor amounts of various scrap metals other than the principal metal within the scrap and the like. Aluminum scrap will also normally contain varying amounts of aluminum oxide resulting from the oxidation of the aluminum scrap, and or from appropriate anodizing procedures employed in processing the metal from which the scrap originated.

All of these contaminants are preferably removed to as great a degree as possible from the metal scrap prior to the scrap being melted down in an appropriate furnace or melter in order to avoid interference with the operation of the furnace or melter and in order to minimize to as great a degree as reasonably possible the chances of the molten metal obtained from the furnace or melter being contaminated. It has been recognized that an effective manner of getting rid of the organic contaminants present on a scrap metal such as scrap aluminum is to heat the scrap aluminum to sufficient temperatures that substantially all of the organic contaminants will decompose and so that the resulting decomposition products will substantially all vaporize.

It has also been recognized that such scrap would be heated at a temperature which is sufficiently low so as to minimize oxidation of the aluminum and at a temperature which is sufficiently low so that there is little chance of the aluminum scrap tending to agglomerate or fuse into a body which is difficult to handle or which must be broken up. It has also been recognized that the amount of time that the scrap is heated should be controlled so that the scrap is heated no longer than is reasonably necessary to decompose the organic contaminants and is not held at an elevated temperature sufficient to accomplish such decomposition for a sufficient period for agglomeration of the aluminum particles to take place. Although a wide variety of different separation techniques based upon differences in various physical properties have been capable of being used to recover inorganic contaminants from metal scrap such as aluminum scrap, it normally has not been economic to utilize such procedures. In the recovery of aluminum from aluminum scrap various organic contaminants of an oxide character have normally been separated in a furnace or melter. The majority of such contaminants will float to the top of the bath of molten aluminum or form slag or slag-like skin of inorganic contaminants or slag-like skin of inorganic contaminants on the molten metal which can be skimmed off of the metal in accordance with well established techniques. Excessive slag formation during recovery of metal such as aluminum is disadvantageous because of increased labor costs in removing such slag and loss of metal during such removal procedures.

Various procedures have been proposed for the removal of organic contaminants from scrap such as aluminum scrap. One method has involved heating a bed or body of scrap either directly or indirectly to a point where various organic contaminants vaporize so that they can be ignited. Other procedures have involved conveying a bed of aluminum through a heated chamber while either hot gas is circulated through the bed or while a flame is directed toward the moving bed of scrap. Such procedures are disadvantageous for a variety of reasons. Whenever a flame is directed at a bed of aluminum scrap, there is a significant probability of at least some of the aluminum being oxidized. Of course, any such oxidation results in lowering of the amount of aluminum metal recovered. Further, the heating of aluminum scrap is relatively difficult to control because the quantity of organic contamination of such scrap may vary significantly. Some procedures are unsafe because of explosion hazards caused by the presence of significant quantities of organic material in the air.

In a more recent process, aluminum is recovered from aluminum scrap using a process in which aluminum scrap is fed into the upper inlet of a rotary kiln located so that the discharge end of the kiln discharges the scrap directly into a melting furnace. In such process, the kiln and the furnace are connected by appropriate conduits or ducting containing a burner and a blower so that there is a continuous gas flow through the furnace and then through the kiln. Such flow is counter-current to the direction of scrap flow in the kiln. The burner serves to maintain the temperature of the recycled gas to a designated value. With such type of systems, some of the recycled gas is bled off from the system through a vent in the furnace so it can discharge to the atmosphere. This separated gas may then pass through a recuperator so as to preheat either the air supplied to the burner to sustain combustion or the fuel burned in the burner or both. Although this process has some advantages over earlier procedures, it is considered to be disadvantageous for several reasons. The rotary kiln used with this procedure is essentially operated in a conventional manner so as to heat the scrap passing through it by the counter-current flowing gas stream. Such is not considered to tend to effect any significant removal of inorganic contaminants in the scrap and, further, if there is any removal of inorganic contaminants from the scrap, it is considered that such procedure will only convey the inorganic contaminants back to the furnace where they will tend to settle out and form slag or skin on the molten metal within the furnace. Additionally, because of the counter-current flow within the rotary kiln and the relationship of the kiln to the furnace, the temperature of the scrap discharged to the furnace will be related to the temperature within the furnace. As a consequence of this, it is considered that it is impossible to obtain the degree of temperature control in the furnace necessary for most effective removal of organic material from the scrap.

More recently, U.S. Pat. No. 4,264,060 discloses an apparatus and method for recovering scrap metal. The apparatus consists primarily of a direct-fired rotary kiln. In such a process, scrap is passed through the upper inlet of a rotary kiln while rotating the kiln so that the scrap is cascaded through the interior of the kiln as it is simultaneously moved through the kiln to the lower discharge end of the kiln, concurrently passing a gas stream at a temperature sufficient to cause decomposition and vaporization of organic material in the scrap through the kiln from the upper end to the lower end of the kiln so the gas stream contacts the scrap as it is cascaded through the interior of the kiln, and then separating the gas stream from the scrap at the discharge end of the kiln as the scrap is discharged from the kiln. The heated scrap is then directly passed to the melting furnace under such conditions that the gas stream from the kiln is isolated from the atmosphere above the melting furnace. The gas stream from the kiln is preferably passed through a dust collector to remove entrained inorganic materials and then is burned in an incinerator used to supply the hot gas stream introduced in to the inlet end of the kiln. The incinerator may also be used to burn or incinerate gas from the furnace or melter.

U.S. Pat. No. 4,411,695 discloses an improvement of the foregoing process wherein metallic scrap is decontaminated in a container by concurrently passing in the same direction both the scrap and a hot gas through the container transferring heat from the hot gas to the scrap.

Aluminum scrap recovery system wherein aluminum is recovered from scrap by volatilization of organics from the scrap in a hearth are described in U.S. Pat. No. 3,650,830 and U.S. Pat. No. 4,010,935.

U.S. Pat. No. 4,394,166 describes an aluminum scrap recycling process utilizing an indirect fired rotary kiln and an afterburner.

Although some degree of success has been achieved with the foregoing processes, especially the latter, such procedures are not as effective with aluminum scrap containing thermal barrier material. Such scrap is particularly unsuitable for direct charging to melt furnaces because of dense smoke pollution which is emitted. Chopping of the thermal barrier containing scrap into very small particles, less than one-half inch and separation of the aluminum therefrom by mechanical means, such as vibration, is not only expensive but results in excessive melt-loss.

In some thermal break shapes, the plastic or thermal barrier material is substantially bonded to the metal. Removal of the plastic by mechanical means is extremely difficult, if not impossible. In other thermal break shapes, the thermal barrier material is mechanically joined to the metal. Mechanical separation is difficult and costly even with these types of scrap shapes.

SUMMARY OF THE INVENTION

The present invention provides a process for reclaiming scrap metal, particularly aluminum metal and especially, the latter containing thermal barrier material such as plastic, namely PVC, polyurethane, ABS or like materials. Scrap containing thermal barrier materials and/or other undesirable matter such as paint, lacquer, oil or the like is comminuted into relatively short pieces, conveyed to a storage hopper and then transferred to a fluid bed furnace. The scrap pieces are then heated to a temperature sufficient to separate the undersirable materials from the metal by vaporization, combustion, pyrolysis or the like. The pre-heated scrap is conveyed to a charge well of an existing melt furnace for melting and further processing.

BRIEF DESCRIPTION OF THE DRAWINGS

The construction designed to carry out the invention and the features thereof are described hereinafter.

The invention will be more readily understood from a reading of the following specification and by reference to the accompanying drawings forming a part thereof, wherein an example of the invention is shown and wherein.

DESCRIPTION OF THE PREFERRED EMBODIMENTS

Figure 1:
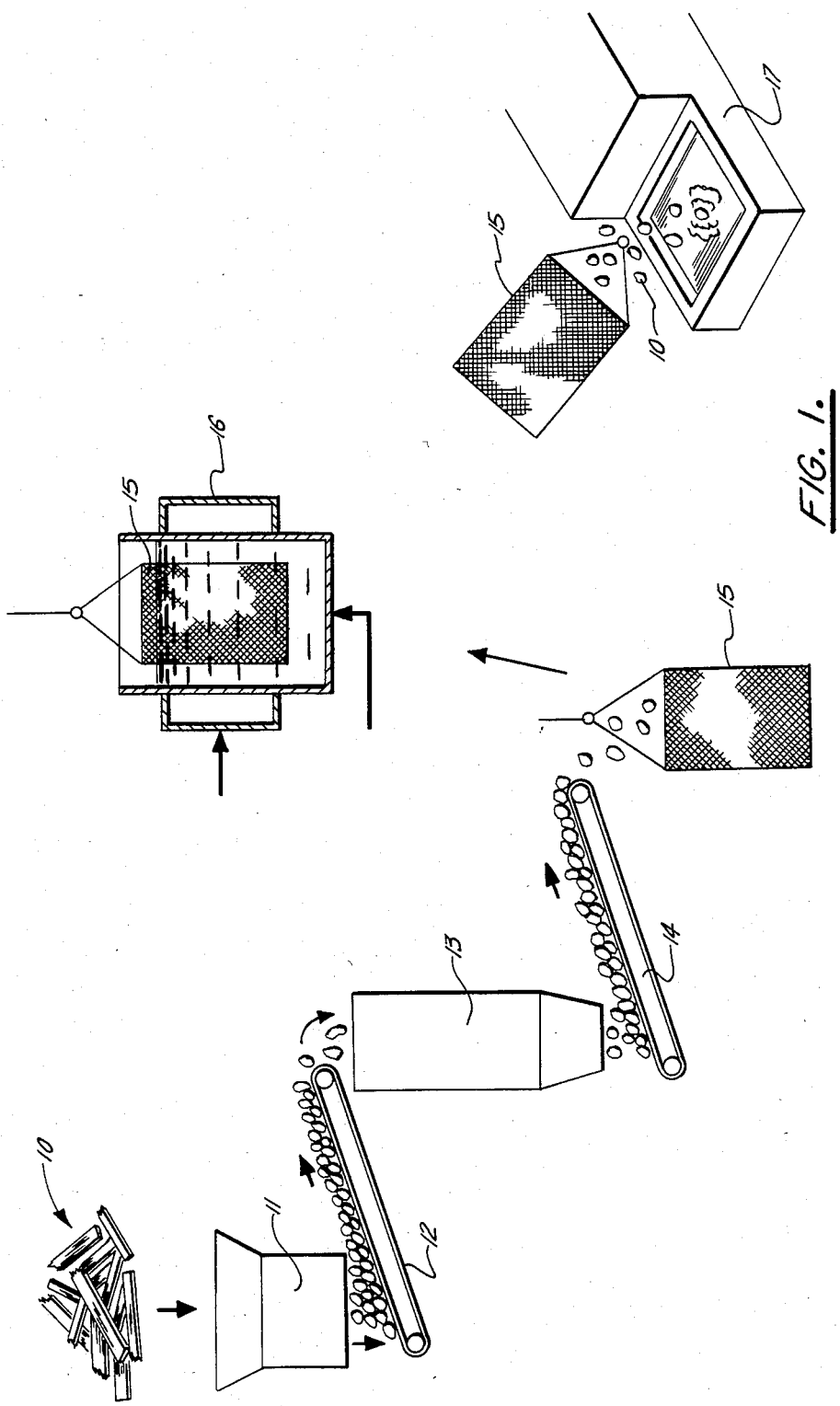
FIG. 1 is a schematic flow diagram setting forth a batch process of the present invention.

Referring to FIG. 1, a scrap pile of thermal-barrier containing aluminum scrap is indicated generally at 10. Scrap from the scrap pile is transferred to a comminutor or chopper 11 where the various scrap metal pieces are reduced to lengths no longer than about 24 inches. The small pieces of scrap metal are then discharged to a conveyor 12 and transported to a bin or storage hopper 13. The chopped scrap is then discharged to another conveyor 14 and then into a scrap basket 15 or other suitable container. The scrap basket 15 containing a supply of the scrap 10 is lowered or transferred into a fluidized bed furnace 16. The furnace is preferably indirect gas fired. After heating the scrap to a temperature of 600° F. to 1000° F. sufficient to separate the thermal barrier material and any other undesirable materials from the metal, the scrap containing basket 15 is transferred to a melt furnace 17 where the scrap 10 is dumped from the basket, melted and then further processed.

Figure 2:
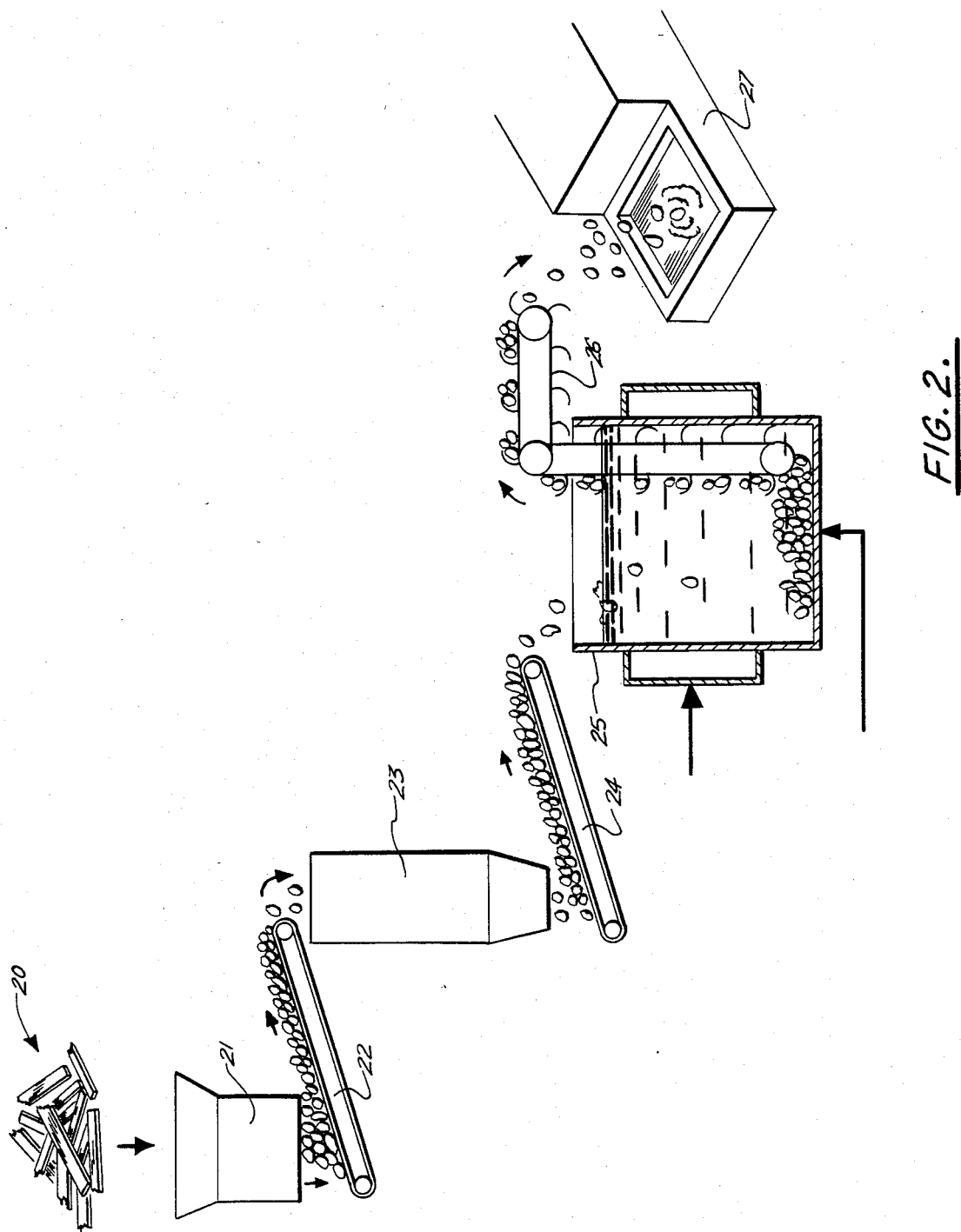
FIG. 2 is a schematic flow diagram setting forth a continuous process of the present invention.

Referring now to FIG. 2, a continuous process is illustrated, wherein a scrap pile of aluminum containing thermal barrier material is indicated generally at 20. Scrap from the scrap pile is transferred to a comminutor or chopper 21 where the various scrap metal pieces are reduced to relatively short lengths, preferably no longer than about 18 inches or less. The comminuted scrap is then discharged to a conveyor 22 and transported to a bin or storage hopper 23. Scrap from the hopper 23 is then discharged to another conveyor 24 and from the latter directly into a fluidized bed furnace 25. After the scrap is heated to 600° F. to 1000° F., sufficient to separate the thermal barrier material and any other undesirable materials from the metal, it is transferred to a conveyor 26 and then discharged into a melt furnace 27 for melting and further processing.

Urethane has a flash ignition of 482° F. and self-ignition at 1112° F. Substantially all of the urethane is driven off about 800° F. Products of the combustion of urethane should contain about 225 ppm of carbon monoxide, trace values of $NO_x$, and 2 ppm of cyanides.

Metal losses during processing are caused by the presence of oil or thermal barrier materials such as urethane on the surface of aluminum scrap, exposure of the metal surface to the oxidizing atmosphere in direct-fired furnaces, excessive comminution or size reduction of scrap, and melting by exposure to flame. The instant process is expected to reduce metal loss by eliminating surface contaminants, by reducing exposure to combustion products, and by providing only enough comminution to facilitate handling, pre-heating and complete submergence in the molten bath of a melt furnace.

The present invention may be used for the melting of any type of metal scrap. It is particularly suited however for the processing of aluminum scrap containing thermal barrier material. Aluminum containing vinyl, polystyrene or urethane is specially suited for treatment in the process. The process is also suitable for use with mixtures of various types of thermal barrier metal materials, including those mentioned as well as any other aluminum containing plastic materials.

The process is carried out at controlled temperatures, and may be batch but is preferably continuous. A fluidized bed furnace is essential.

Ashes, oxides, dirt and other fines and solid particulates are picked up at the discharge end of the furnace. They are then collected in a cyclone followed by a bag-house.

Plastic thermal break materials are completely removed, with no visible residues. All paint is removed from the metal surfaces, leaving only a powdery pigment coating.

Processed aluminum scrap can be charged into a reverbatory furnace without causing or producing emission problems.

The foregoing disclosure and description of the invention is illustrative and explanatory thereof and various changes in the illustrated process may be made within the scope of the appended claims without departing from the spirit of the invention.

What is claimed is:

1. A method for recycling aluminum scrap containing thermal barrier material, said method comprising the steps of:
   (a) comminuting said aluminum scrap to pieces less than about 24 inches in length thereby preparing a relatively uniformly sized aluminum scrap product;
   (b) conveying said comminuted aluminum scrap product to a storage hopper;
   (c) conveying the comminuted aluminum scrap product from said storage hopper to a fluidized bed furnace scrap container;
   (d) transferring said fluidized bed furnace scrap container with said comminuted scrap product therein to a fluidized bed furnace;
   (e) heating said aluminum scrap product in said fluidized bed furnace scrap container in said fluidized bed furnace to a temperature of about 600° to 1000° F. for a period sufficiently to substantially completely remove said thermal barrier material from said aluminum scrap product as combustible gas and cinder thereby producing a satisfactory aluminum melt furnace feed product in said fluidized bed furnace scrap container; and
   (f) removing said fluidized bed furnace scrap container with said aluminum melt furnace feed product therein from said fluidized bed furnace; and
   (g) transferring said aluminum melt furnace feed product from said fluidized bed furnace scrap container to an aluminum melt furnace for melting.

2. The method of claim 1, wherein said thermal barrier containing aluminum scrap contains from about one to about ten weight percent of said thermal barrier material.

3. The method of claim 1, wherein said thermal barrier containing aluminum scrap is comminuted to lengths of less than about 18 inches in length.

4. The method of claim 1, wherein said comminution of step (a) is carried out intermittently.

5. The method of claim 1, wherein said thermal barrier material in said thermal barrier containing aluminum scrap is selected from rigid polyvinyl chloride or polyurethane materials.

6. The method of claim 1, wherein said thermal barrier material in said thermal barrier containing aluminum scrap is polystyrene.

7. The method of clam 1, wherein said thermal barrier material in said thermal barrier containing aluminum scrap is plastic.

8. The method of claim 1, wherein said thermal barrier containing aluminum scrap is covered with at least some oil or paint.

9. A method for recycling aluminum scrap containing thermal barrier material, comprising the steps of:
   (a) comminuting said thermal barrier containing aluminum scrap to pieces less than about 24 inches in length, thereby preparing a relatively uniformly sized thermal barrier containing aluminum scrap product;
   (b) conveying said communited thermal barrier containing aluminum scrap product to a storage hopper;
   (c) continuously feeding said comminuted thermal barrier containing aluminum scrap product from said storage hopper to a fluidized bed furnace, said furnace containing a conveyor means for continuously receiving and transferring an aluminum melt furnace feed product to an aluminum melt furnace;
   (d) heating said comminuted thermal barrier containing aluminum scrap product in said fluidized bed furnace at a temperature of about 600° F. for a sufficient period of time to substantially completely remove said thermal barrier material from said thermal barrier containing aluminum scrap product as combustible gas and cinders and thereby producing a satisfactory aluminum melt furnace feed product; and
   (e) transferring said aluminum melt furnace feed product from said fluidized bed furnace via said conveyor means to an aluminum melt furnace for melting.

10. The method of claim 9, wherein said thermal barrier containing aluminum scrap contains from about one to about ten percent by weight of said thermal barrier material.

11. The method of claim 9, wherein said thermal barrier containing aluminum scrap is comminuted in step (a) to lengths of less than about 18 inches in lengths.

12. The method of claim 9, wherein the comminution of step (a) is carried out intermittently.

13. The method of claim 9, wherein said thermal barrier material in said thermal barrier containing aluminum scrap is selected from rigid polyvinyl chloride or polyurethane materials.

14. The method of claim 9, wherein said thermal barrier material in said thermal barrier containing aluminum scrap is polystyrene.

15. The method of claim 9, wherein said thermal barrier material in said thermal barrier containing aluminum scrap is plastic.

16. The method of claim 9, wherein said thermal barrier containing aluminum scrap is covered with at least some material selected from the group consisting of oil and paint.

* * * * *